United States Patent [19]

Chayer

[11] 3,963,137
[45] June 15, 1976

[54] VEHICLE FOR HANDLING MULTI-FURROW PLOUGH

[76] Inventor: William J. Chayer, Box 99, Cottam, Ontario, Canada

[22] Filed: Apr. 21, 1975

[21] Appl. No.: 569,775

[52] U.S. Cl............................ 214/501; 214/86 A; 172/491; 172/605; 172/504
[51] Int. Cl.² ........................................ A01B 59/043
[58] Field of Search............. 214/501, 86 A, 130 R; 280/461 R, 461 A; 172/310, 311, 452, 463, 439, 467, 479, 491, 605, 504

[56] References Cited
UNITED STATES PATENTS

| | | | |
|---|---|---|---|
| 3,523,699 | 8/1970 | Sinkule et al. | 172/311 X |
| 3,727,698 | 4/1973 | Selus | 214/501 X |
| 3,843,093 | 10/1974 | Thompson et al. | 214/86 A |

Primary Examiner—Albert J. Makay
Attorney, Agent, or Firm—Charles Krassov

[57] ABSTRACT

This invention consists of a vehicle for handling multi-furrow ploughs, which are very heavy and are equipped with only one wheel in the rear, when not attached to a tractor during operation. It consists of a two wheeled cart provided with two hooks attached to the main body of the cart, by means of which the front end of the plough is picked up and held, and a central arm for pulling the cart which is swivably attached to the main body. A ratchet operated cylinder having two oppositely threaded screws, one going in or out at each end simultaneously, is swivably attached to the arm and to the main body of the cart, so that turning the ratchet in one direction expands the distance between the screw ends thus lowering the hook towards the ground to pick up the front end of the plough, and turning it in the opposite direction reduces that distance and lifts the hooks and front end of the plough to make it mobile. A variation of the above invention shows the hooks being attached to a pair of hydraulic jacks, thereby replacing the said ratchet operated cylinder and the swivel attachment of said central arm.

4 Claims, 6 Drawing Figures

VEHICLE FOR HANDLING MULTI-FURROW PLOUGH

This invention consists of a vehicle used in handling and transporting multi-furrow ploughs.

A standard type of multi-furrow plough consists primarily of a number of spaced ploughshares strung along a central shaft, the front end of which is attached to a tractor while the rear end is provided with a single wheel. When the plough has to be transferred from one location to another, without the use of the tractor, as for instance to and from storage or field locations, the handling becomes a problem. There being only one wheel in the rear of the plough which usually weighs about three tons, the front end has to be lifted so that the ploughshares are off the ground and then pulled along to its next destination.

It is therefore the object of this invention to provide a vehicle which can be attached to the front end of the plough, raise it to the required height off the ground and make it mobile.

Figures 1, 5:
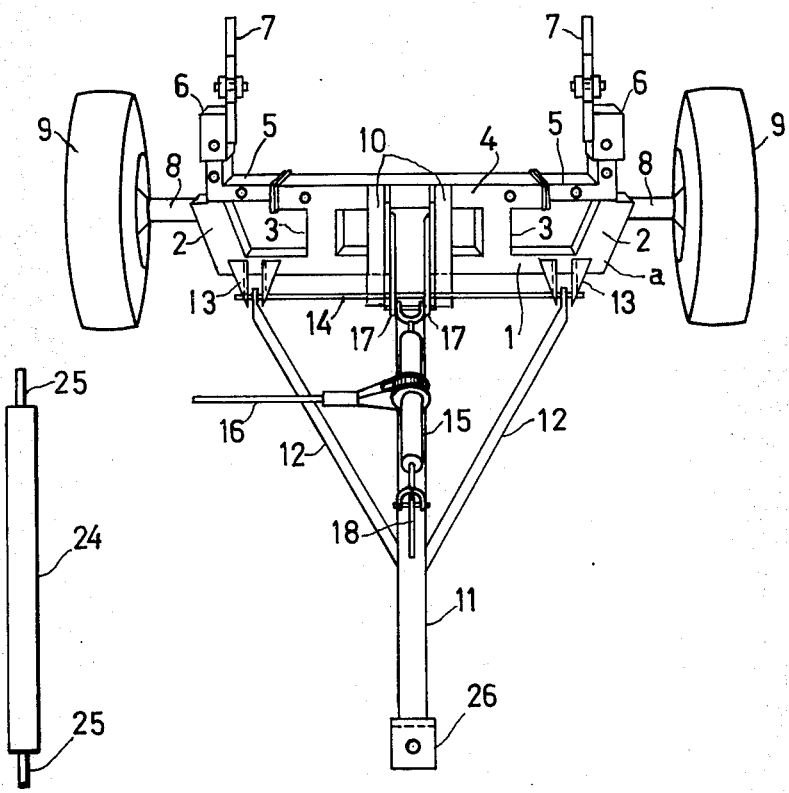
Figure 2:
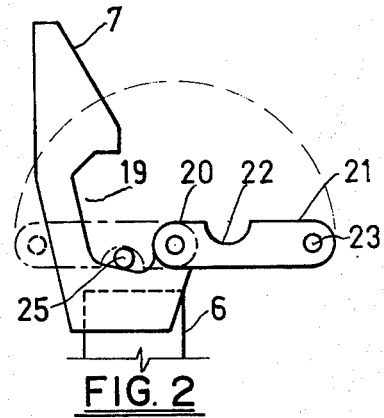
Figure 3:
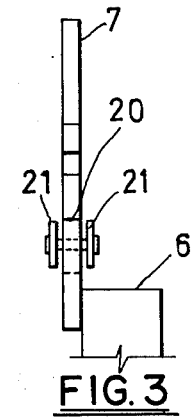
Figure 4:
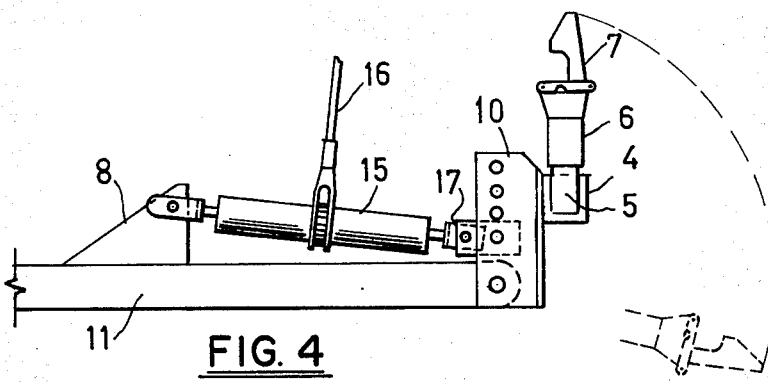
Figure 6:
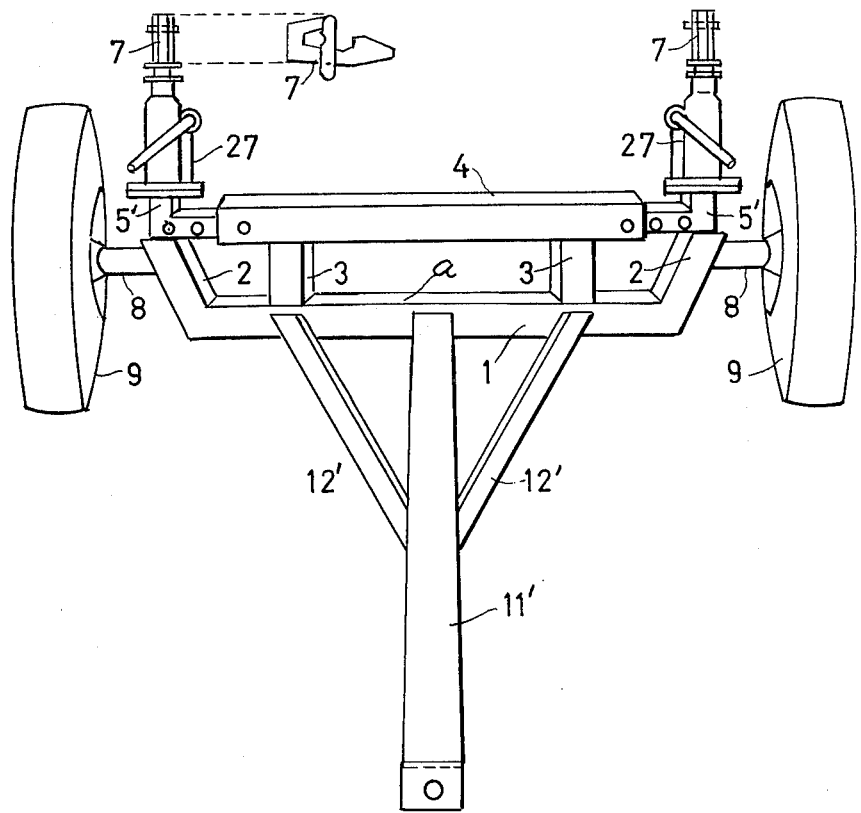

In describing the invention reference will be made to the attached drawings in which, FIG. 1 is a simplified three-dimensional plan of the invention, FIG. 2 is a side elevation showing in detail the hook component of the invention, FIG. 3 is an end view of the item shown in FIG. 2, FIG. 4 is a side elevation showing in detail the raising and lowering mechanism of the invention, Fig. 5 shows the part of a standard multi-furrow plough by means of which said plough is attached to a tractor or to the above invention, and FIG. 6 shows a variation in the design of the invention.

In the drawings, the invention is shown consisting of a main framework $a$ which is built of steel having a rectangular box section. It is made up of a straight horizontal base member 1 which is bent upwardly at each end at a diverging angle 2. A top straight member 4 which is parallel to the base member 1 is spaced from 1 and supported by a plurality of stays 3. The top member 4 is centrally located in relation to, and shorter than the base member 1.

An L shaped rectangular member 5 slides in and out of each end of the top member 4 and can be locked in position by passing a pin through corresponding holes in the member 4 and in the horizontal part of the member 5. Each vertical part of member 5 is provided with a short member 6 which slides up or down upon it, and can be fixed to the required height by passing a pin through corresponding holes in it and in said vertical part of 5, attached to each member 6 is a hook 7 details of which are shown in FIG. 2 and fully described further on in the specification. The various pin holes in the members 4, 5, and 6 are provided so that the width between the hooks 7 and their height can be adjusted to suit different sizes and construction of multi-furrow ploughs. The relation between the parallel members 1 and 4 is such that the sliding members 5, 5, are free to slide upon and past the tops of the diverging members 2, 2. Attached to the outside of each of the members 2, by means of an axle 8 is a rubber tired wheel 9.

Centrally located on the face of the main framework $a$ is a pair of spaced angle irons 10, 10, to which is attached the central arm 11 by means of which the vehicle is pulled. This arm also has a rectangular box cross-section. Each side of the arm 11 is provided with a knee brace 12 which is rigidly attached at one end to said central arm while the other ends are held within a pair of brackets 13, 13, which are attached to the face of the main framework $a$, said knee braces being free to rotate upon a bar 14 which passes through the angle irons 10, 10, and brackets 13, 13.

The vehicle is provided with a ratchet operated tapped cylinder 15 each half of which contains an opposite hand threaded screw. The screw in forward end of 15 is swivably attached to a pair of plates 17, while the screw in the rear end of 15 is swivably attached to a plate 18 attached to the arm 11. By rotating the ratchet 16 in either direction, the end to end distance of the contained screws becomes either longer or shorter, so that by extending the end to end distance of said screws, the hook 7 can be made to rotate downwardly as shown in FIG. 4, or by rotating the ratchet in the opposite direction, the end to end distance of the screws is made shorter causing the hook 7 to rise.

The hook 7 is made of heavy steel plate having a cavity 19 which terminates in a short upward lip 20. Swivably attached to the lip 20 is a pair of snaps 21, 21, one on each side of said lip; and each snap is provided with a circular cavity 22, and a hole 23 in the free end thereof.

In FIG. 5 is shown a typical cross shaft 24 of a multi-furrow plough, by means of which said plough is attached to a tractor. This shaft consists of a heavy central section terminating at each end in a short shaft 25 of smaller diameter than the central section. It is by these short shafts that the plough is attached to the tractor and also to the invention.

The procedure in handling the plough consists of bringing the vehicle in line with the front of the plough and lowering the hooks to contain the shafts 25, 25. The hooks are than raised to the required elevation and the snaps 21 are closed over said shafts so that they are held within the cavity formed by the cavities 19 and 22. A pin or bolt is passed through the holes 23 to prevent the snaps 21 from opening. The plough is now supported on two side wheels and one rear wheel and can be easily moved. A clevis 26 is provided on the end of the arm 11 for attaching the vehicle to a car, truck, or harness.

In FIG. 6 is shown a variation in the invention. In this case the main framework $a$, the axles 8, 8, and the wheels 9, 9, are the same as previously described. However, the L shaped members 5, 5, are changed to 5', 5', in which case the vertical part of the L is shortened and is not provided with line up holes, since its height remains fixed. Attached to each of the vertical parts of the L is a hydraulic jack 27, and the hook 7, which remains the same, is attached to the lift piston of the jack, only in this case it is in a horizontal position rather than vertical as shown in FIG. 1. This eliminates the need for the screw device 15; and the central arm 11, with its knee braces 12, 12, which are now designated as 11', 12', 12', are now rigidly fixed to the main framework $a$.

Having described the invention, what I claim is,

1. A vehicle for handling and transporting multi-furrow ploughs constructed mainly of rectangular box cross-section steel, comprising a main body consisting of a horizontal base beam having an upwardly bent section at a diverging angle at each end thereof, an upper shorter beam spaced from and parallel to said base beam, attached to said base beam by a plurality of upright stays; a rubber tired wheel attached to each of said upwardly bent base sections; an L shaped member sliding in or out of each end of said upper beam; corresponding spaced holes in said upper beam and its contained L shaped member for locking said L shaped member in a required position by passing a pin through lined up holes; a short section sliding telescopically over the top of the upright of each of said L shaped members; corresponding holes in the upright part of the L and the telescopic sections sliding upon it, for locking said telescopic section at the required height by passing a pin through lined up holes; a hook of heavy steel plate rigidly attached to one side of each of said telescopic sections, said hook being provided with a two walled swivably attached snap having a semi-circular cavity in the upper edge thereof in its open position, said snap being capable of folding backwardly to enclose the hook and any item hooked therein; means for drawing the vehicle comprising an elongated arm by means of which the vehicle is drawn having a diverging knee brace extending from each side thereof, said arm and braces being centrally located in relation to said base beam and swivably attached to a bracket consisting of two spaced angle irons attached to said main body; means for lowering and raising the said hooks comprising a ratchet operated cylinder tapped on the inside and containing a screw in each end thereof, said screws being opposite thread to each other, said cylinder being located on top of said arm and swivably attached by one end thereto, the other end of said cylinder being swivably attached to a pair of spaced plates slidably located within said angle iron bracket, and said angle irons of the bracket and contained plates being provided with corresponding holes by means of which the cylinder attachment at the main body can be determined by lining up said bracket and plate holes and passing a pin through them; and the rotation of said ratchet in one direction expands the distance between the ends of the screws so that the said hooks are lowered towards the ground to pick up the free end of a multi-furrowed plough, while the rotation of said ratchet in the opposite direction lifts up the hooks and their captured free end of the plough to make the vehicle and the plough mobile.

2. A vehicle such as described in claim 1 in which the main body, its telescopic components, and the central arm are made of steel pipe sections.

3. A vehicle such as described in claim 1 in which the mrans for drawing the vehicle comprising a central arm and its knee braces which are rigidly fixed to said base beam; and said means for lowering and raising said hooks comprising a hydraulic jack attached to the upper end of each vertical part of said L shaped member, and said hooks being rigidly and horizontally attached to the upper part of the piston of said jack.

4. A vehicle such as described in claim 3, in which the main body, the L shaped components, and the central arm with its knee braces are made of steel pipe sections.

* * * * *